United States Patent Office 3,406,103
Patented Oct. 15, 1968

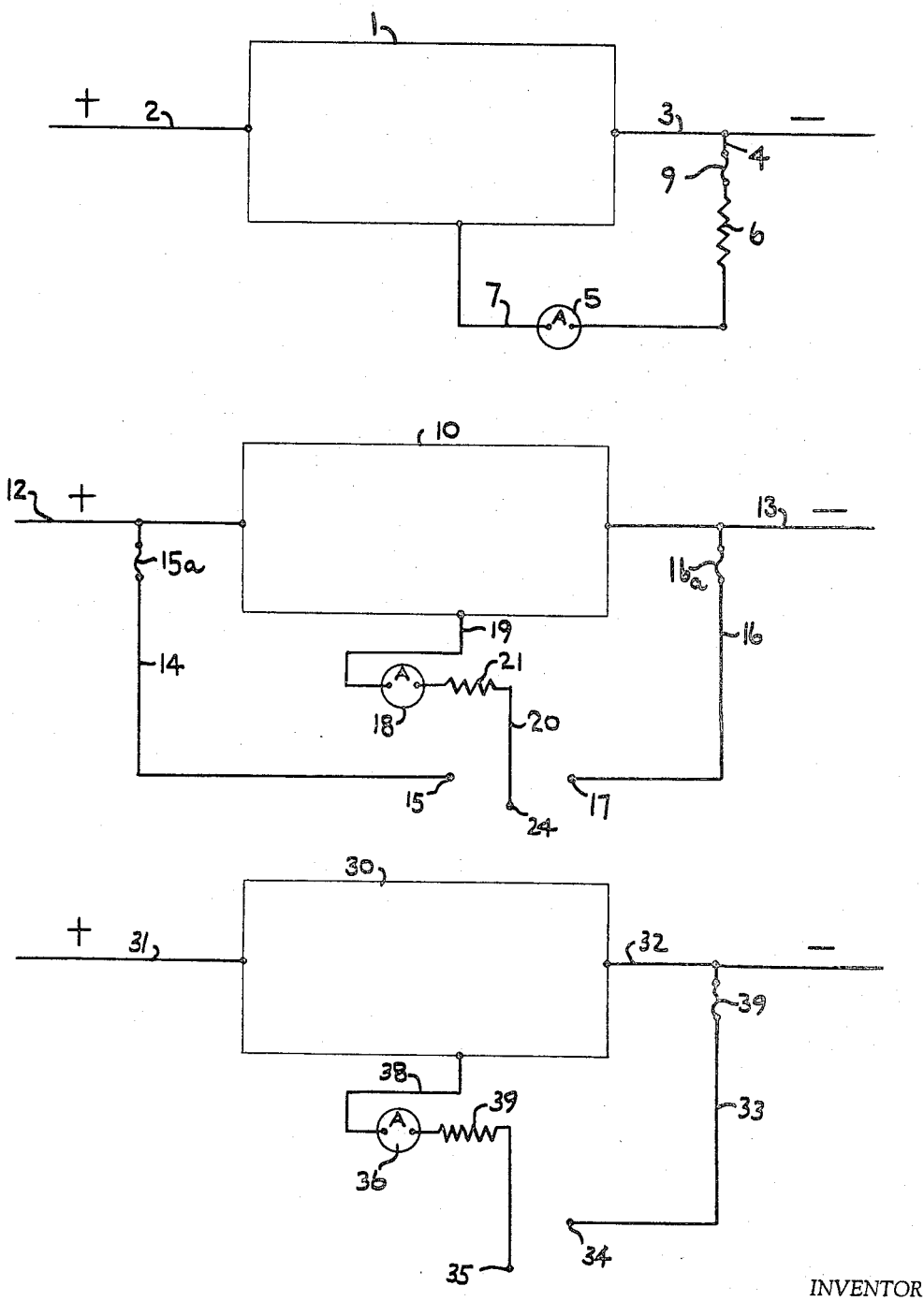

3,406,103
METHOD AND APPARATUS FOR MONITORING LINING DAMAGE OF ALKALI METAL CHLORATE BIPOLAR CELLS
Carl W. Raetzsch, Corpus Christi, Tex., assignor to Pittsburgh Plate Glass Company, Pittsburgh, Pa., a corporation of Pennsylvania
Filed May 21, 1965, Ser. No. 457,667
5 Claims. (Cl. 204—1)

ABSTRACT OF THE DISCLOSURE

A method and apparatus for monitoring an alkali metal chlorate cell for lining damage wherein a current meter is connected between the negative terminal of the cell current source and a side of the cell which is electrically conductive but normally electrolytically insulated from the electrolyte in the cell. Current flow measured by the meter exceeding a predetermined value is indicative of lining damage in the cell.

---

The present invention relates to the operation of alkali metal chlorate cells. More particularly, the present invention relates to a method of protecting the lining and walls of an alkali metal chlorate cell and to a method of monitoring such cells to determine the condition of the lining during cell operation.

In the operation of electrolytic cells of the type described in U.S. Patent 2,799,643 it is conventional to place on the interior of the cell box which is exposed to electrolyte during cell operation a lining which is typically chemically resistant to cell electrolytes such as rubber, polyvinyl chloride, polyester resins and other similar chemical resistant lining materials. These linings protect the cell sides which are normally constructed of structural metal such as steel and typically serve also as an insulator. These cell linings because of defects in manufacture, for example, uneven thickness, thermal stress encountered in cell operation and other similar mechanical problems may develop breaks or pin holes which expose the cell box sides to electrolyte. These small defects can be tolerated while they are small but become very bothersome when they enlarge. Cell linings are, because of the size of the electrolytic cells employed, costly and since each cell box contains a multiplicity of cell units it is not desirable to replace or repair them except during anode renewal outages unless it becomes absolutely necessary due to damage of the lining at a given place along the sides, ends or bottoms of the cell.

In accordance with the instant invention a method has been provided for protecting these cell boxes and linings from damage during cell operation. In addition, a method is provided which permits the monitoring of an electrolytic alkali metal chlorate cell of the above type during cell operation to determine the condition of the cell lining at any given moment in time for the purposes of making a judgement whether or not to shut the cell down for a lining repair or replacement.

For a more complete understanding of the present invention reference is made to the ensuing description and the accompanying drawings in which:

FIGURE 1 shows a diagrammatic plan view of one form which may be employed for providing protection to the cell lining of an alkali metal chlorate cell;

FIGURE 2 shows a diagrammatic plan view of one embodiment which may be used to monitor the cell lining of an operating alkali metal chlorate cell; and FIGURE 3 shows a diagrammatic plan view of a further embodiment of a monitoring system for use in an alkali metal chlorate cell to determine the condition of the cell lining when the cell is in operation.

Turning to the drawings, FIGURE 1 in particular, there is shown diagrammatically an electrolytic cell of the type described in U.S. Patent 2,799,643, and generally indicated by the numeral 1. The cell is supplied current from a positive busbar 2 and current is withdrawn from the cell through negative busbar 3. On the negative side of the busbar arrangement an electrical lead 4 is attached to the negative busbar and to an ammeter 5. In the line 4 is located a resistor element 6 and a fuse 9. The other side of the ammeter 5 is connected via an electrical lead 7 to one side of the cell box 1. By virtue of this electrical arrangement the cell box is thus maintained negative with respect to the electrolyte contained within the cell units across the cell and thus protects the cell box from attack by the electrolyte should there be a break in the cell lining. The ammeter 5 gives a constant measurement of current and thus serves as an indicator for determining the extent of corrosion or lining failure occurring within the cell box. The resistor element is utilized as a means of regulating current flow in the line 4 and preventing damage to the line 4 when excessive currents are encountered. Similarly fuse element 9 indicates excessive current flow and will be destroyed when currents in excess of the fuse capacity are encountered.

In FIGURE 2 a further embodiment of the instant invention is shown wherein a monitoring system is provided to determine the extent to which lining failure has occurred in a cell during cell operation. In this arrangement a cell box 10 is shown which has power supplied to it by positive busbar 12 and negative busbar 13. An electrical lead 14 is connected to the positive busbar and contains at one end a contact point 15. A fuse element 15a is located in line 15. A similar lead 16 is attached to the negative busbar and contains at its terminal end a contact point 17. A fuse element 16a is positioned in line 16. Located at the side of the box is a measuring ammeter 18 which is connected to the side of the box through lines 19 and 20. Located in line 20 between the ammeter 18 and contact point 24 is a resistor 21. Contact point 24 serves as a double pole switch so that the ammeter element can be connected to either point 15 or point 17 of lines 14 and 16 respectively.

In the operation of this system a double pole switch is provided to permit monitoring of an alkali metal chlorate cell which has its current reversed periodically as is standard procedure in the art. This type operation is described in U.S. Patent 2,799,643 in column 4, lines 63–70. Thus in the operation of the device of FIGURE 2 when busbar 12 is positive and it is desired to monitor the system to determine the extent to which lining failure may have occurred, this measurement is provided by connecting switch element 24 to contact point 17. The ammeter should be designed to provide a measure of the extent to which lining failure has occurred. Thus for example, if the ammeter is such that it registers amps from 100 milliamps to 100 amps, a multi-range meter is preferable for this purpose when the contact point 24 is connected to contact point 17 current will flow in the ammeter provided there is some deterioration or failure in the cell lining. This current measurement will vary in intensity from the lowest milliamp figure the instrument measures to the highest amp figure the instrument registers depending upon the extent to which the lining has failed. Generally, the higher the amperage the greater the damage to the lining. Thus, for a given cell lining of a given area which experience has shown to be substantially damaged and in need of repair when a current measurement of 20 amps is measured on an ammeter of this type, the cell operator need merely connect the ammeter contact point switch 24 to the negative contact point 17 periodically and take an ammeter reading. Until the ammeter reads 20 amps the operator knows the cell lining is in suitable condition for continuous operation of the cell. When the figure on the ammeter exceeds the 20 amp figure determined for repair or replacement of the lining then the cell is shut down and suitable repair is made.

When a cell of this character has had its current reversed obviously the busbar 12 will become the negative busbar and the busbar 13 will then become the positive busbar. In this situation the operation is conducted in a similar manner except that the contact point 24 of the switch mechanism is now connected to the contact point 15.

While a measurement is being made to determine the extent to which the cell lining may or may not be failing under either of these circumstances the cell wall is also protected from further corrosion since the sides or walls are maintained electronegative with respect to the electrolyte.

In FIGURE 3 a cell box 30 is shown which contains a positive busbar 31 and a negative busbar 32 for supplying current through the cell. To the negative busbar 32 is connected an electrical lead 33 having a fuse element 39 positioned therein. This lead terminates at a contact point 34 which is constructed and arranged to cooperate with a contact point 35 of a switch element containing an ammeter 36. This switch element consists of leads 37 and 38 and resistor 39 which may be a variable resistor. Lead 38 is connected to the side of the cell box. In this arrangement a system is provided for measuring periodically the extent to which the lining of the cell box 30 has failed. In this arrangement the operator simply contacts periodically the contact point 35 of lead 37 to the contact point 34 of line 33 and takes an ammeter measurement. When the ammeter measurement exceeds any set value determined by the operator to be unacceptable current for a given lining then the cell box is shut down for repair of the lining. When the ammeter measurement is below the set value for a given lining obviously the cell is permitted to operate and the contact points are opened once again.

If desired in the arrangement of FIGURES 2 and 3 it would be permissible for the cell operator to connect the contact points of the switch to the negative busbar of the cell box arrangement so that a constant ammeter measurement is made on a continuous basis rather than an intermittent basis. In any event the arrangements of FIGURES 1, 2 and 3 not only provide adequate protection for the lining and sides of the cell during cell operation but they also permit a method by which a measurement of the condition of the lining within a cell box can be determined during cell operation. Thus, by virtue of the instant arrangement it is no longer necessary to shut down an alkali metal chlorate cell in order to inspect the lining for purposes of determining whether repair and/or replacement should be undertaken.

With respect to the monitoring aspects of the instant invention the extent to which current flow will determine the failure of a particular type of lining on the interior of an alkali metal chlorate cell will depend in great measure on the lining employed. In applying the principles of this invention to the operation of a chlorate cell thus it is necessary for an operator initially at least with respect to the cell box to determine by empirical data the physical condition of a particular lining for a given ammeter reading. Generally speaking, linings will have failed to the extent that they need to be replaced or repaired when an ammeter reading of 100 amps or higher is obtained. This consideration is only a general one since it may be the practice of a given operator to apply several layers of linings in a given cell and thus even a higher ammeter reading may be necessary before a cell lining need be replaced or repaired. Also the size of the cell lining in terms of area will dictate to some extent what the permissive amperes are for that lining. Thus, it is advisable when applying the general principles of this invention to employ an ammeter in association with the monitoring equipment which has a wide range of readings from milliamps up to 100 amps or even higher if desired or necessary. Generally speaking a multi-range ammeter measuring in the range of from 100 milliamps to 100 amps is suitable for the purpose of this invention.

Once the given current condition has been established for a given lining, it is a relatively simple matter for the cell operator to then correlate his entire cell operation to the ammeter measuring equipment, so that continuous operation of the alkali metal chlorate cell boxes in a given alkali metal chlorate cell line can be enjoyed and the repair and/or replacement of the linings of the cell boxes employed in a given alkali metal chlorate cell line determined solely on the basis of a simple ammeter measurement. This provides an extremely useful tool for the chemical electrolytic alkali metal chlorate cell operator since he need no longer shut down cells in order to determine the extent to which cell lining damage has occurred. If constant measurements are taken on the meters, extrapolations can be made based upon experience and the rates of current buildup in ammeter readings to permit a reasonable prediction when a given cell lining failure will occur. This gives the operator ample time to prepare for the repair and/or replacement of cell linings during his operating cycle.

In this regard it will be understood by the skilled art that chlorate cell linings because methods of manufacture sometimes have defects in them which result in pin holes appearing early in cell operation. These holes cause current flows in the ammeter early in operation when the cell is monitored as shown in FIGURES 2 and 3. The current typically increases in small increments with time on this monitoring equipment and will ultimately reach a point where a rapid rate change in current flow will be encountered. At this point more frequent checks should be made to insure that the current flow does not exceed the predetermined value set for cell shutdown.

While the invention has been described with reference to certain specific embodiments of course it is to be understood that the invention is not to be limited thereby insofar as appears in the accompanying claims.

I claim:

1. A method of monitoring the operating of an alkali metal chlorate cell comprising periodically connecting one side of the cell to the negative terminal of the cell, said side being electrically conductive but being normally electrolytically insulated from the electrolyte, providing a current metering element between the said side and the negative terminal to measure current flow in said connection and when the current flow exceeds a predetermined value indicative of excessive lining damage disconnecting the flow of current through the cell.

2. A method of monitoring an alkali metal chlorate cell comprising feeding electric current to an alkali metal chlorate cell, positioning between the negative terminal of the current and the side of the cell a current metering element which is permanently connected to the side of said cell but not permanently connected to the negative terminal of said cell, said side being electrically conductive but being normally electrolytically insulated from the electrolyte, periodically connecting said current metering element to the negative terminal of said cell, measuring the current flowing when such connection is made and disconnecting current flow to the cell when the meter registers a current flow above a predetermined value.

3. The method of claim 2 wherein said current metering element is a multi-purpose ammeter.

4. The method of claim 2 wherein the cell current is discontinued when the current meter measures above about 40 amperes.

5. In an electrolytic alkali metal chlorate bipolar cell having a positive busbar and a negative busbar for distributing current thereto the improvement comprising an electrical lead connected to said negative busbar of said cell and terminating at a switch element, said switch element containing an electrical lead connected to the side of said cell and having located in series therewith an ammeter and means to connect said ammeter to the lead connected to said negative terminal, said side being electrically conductive but being normally electrolytically insulated from the electrolyte.

References Cited

UNITED STATES PATENTS

| | | | |
|---|---|---|---|
| 476,914 | 6/1892 | Bernard | 204—196 |
| 1,252,654 | 1/1918 | Betts | 204—231 |
| 1,545,384 | 7/1925 | Ashcroft | 204—196 |
| 2,799,643 | 7/1957 | Raetzsch | 204—270 |
| 2,890,157 | 6/1959 | Raetzsch | 204—196 |
| 2,909,471 | 10/1959 | Nies | 204—196 |
| 3,037,920 | 6/1962 | Vixler | 204—148 |
| 3,249,520 | 5/1966 | Hermann | 204—231 |

FOREIGN PATENTS

| | | |
|---|---|---|
| 412,322 | 5/1943 | Canada. |

HOWARD S. WILLIAMS, *Primary Examiner.*

T. TUNG, *Assistant Examiner.*